June 12, 1962 J. F. SMITH 3,039,081
FREQUENCY SELECTIVE SIGNALLING SYSTEM
Filed March 12, 1959
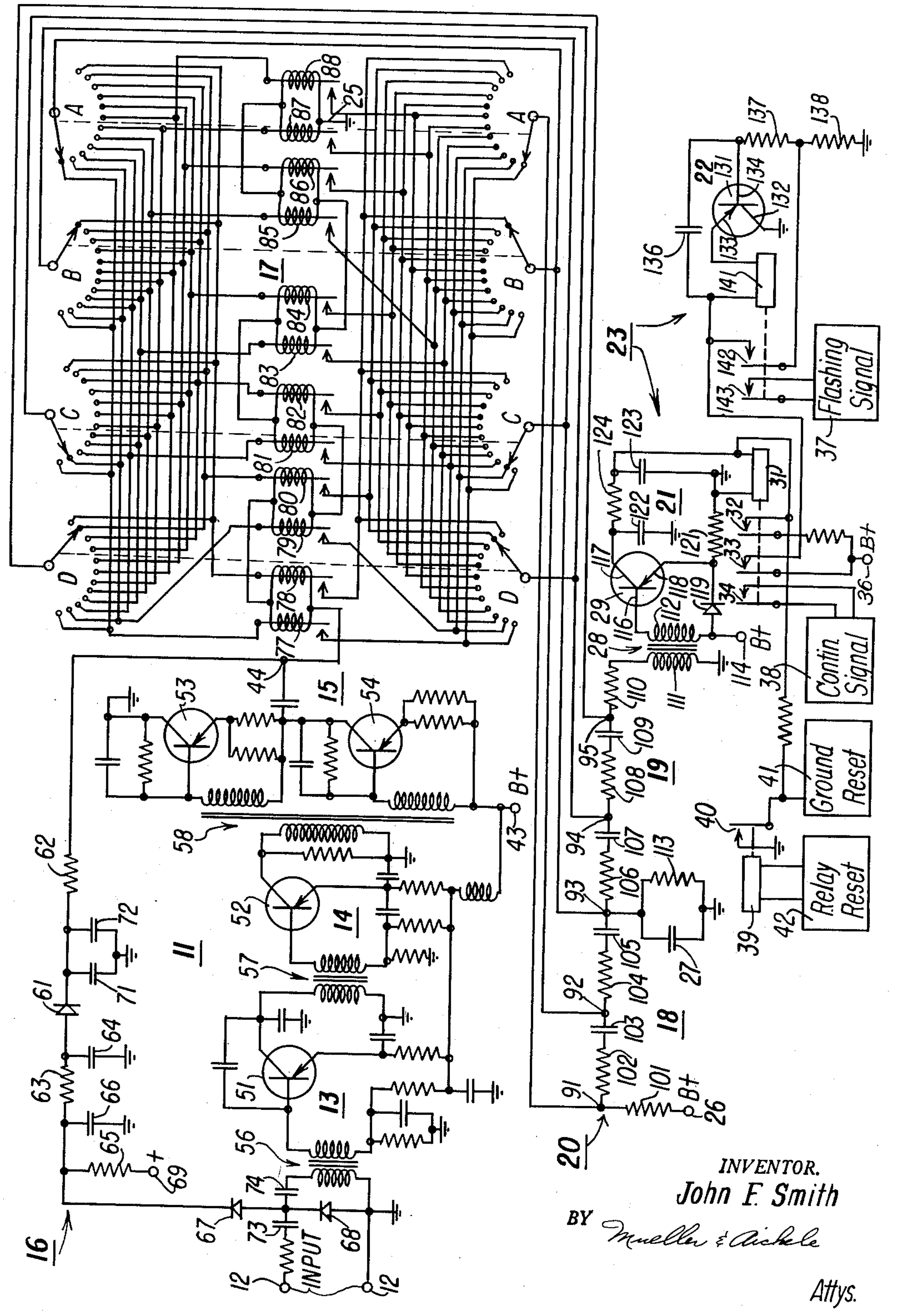
INVENTOR.
John F. Smith
BY Mueller & Aichele
Attys.

3,039,081

FREQUENCY SELECTIVE SIGNALLING SYSTEM

John F. Smith, Berkeley, Ill., assignor to Motorola, Inc., Chicago, Ill., a corporation of Illinois Filed Mar. 12, 1959, Ser. No. 799,032
4 Claims. (Cl. 340—171)

This invention relates generally to frequency selective systems, and more particularly to selective signalling systems for use with radio communications equipment.

Radio communications networks of the type in which a base station and several mobile stations intercommunicate are sometimes provided with selective signalling systems which make it possible to call the various stations individually. Reception of a call by a station may be indicated by operation of an audible or visible alarm which alerts the radio operator, and the signalling system may operate so that only the receiver unit of the station being called will translate the message. In addition, specific functions may be remotely operated at the receiver.

There is a need for such selective signalling systems in aircraft communication service. The equipment for aircraft use must be physically rugged, should be fast and reliable in operation, and must have sufficient code capacity to provide as many different calls as are needed. It has been recognized that the use of transistors and other miniature components in such equipment offers possibilities for providing lighter and more compact constructions and this would clearly be desirable for aircraft installations and for ground use as well. However, many problems are encountered in providing a practical transistorized selective calling system with circuits which are simple and yet completely reliable in operation. For instance, transistors are thermally sensitive and their operating characteristics tend to vary substantially with temperature changes. Also, transistors are relatively low impedance devices and may draw more control current than is desirable.

A further consideration in the provision of suitable signalling equipment is that the selective stages or sections must discriminate against signals such as noise, music and voice which may be received and applied thereto. Although known frequency selective systems provide adequate discrimination against such signals for many applications, the provision of circuits which would give increased protection, and yet which are as simple and economical as those previously known, is considered highly desirable.

Accordingly, an object of the present invention is to provide transistorized selective calling equipment of compact and rugged construction.

Another object of the invention is to provide an improved selective system including a plurality of frequency selective stages arranged so that the possibility of system operation by signals other than the desired calling signals is minimized.

A further object of the invention is to provide selective calling equipment with decoding and control circuits which are simple and yet dependable in operation.

A feature of the invention is the provision of a frequency selective system including first and second selective sections arranged in cascade and including frequency responsive devices which are operable in sequence so that the first section provides an operating voltage which is transferred to the second section to provide a control voltage of a predetermined level, with the first section including a resistance-capacitance circuit providing an integrating response, and the second section including a transformer, a transistor, and a resistance-capacitance circuit to provide further integration, so that the control voltage does not build up to the predetermined level in the event the frequency responsive devices are operated simultaneously by noise or the like.

A further feature of the invention is the provision of a selective calling system as described above in which the control voltage developed by the second section energizes a relay to operate suitable alarm devices, with the operating point of the transistor included in the second section being stabilized by a temperature compensating bias network. A control circuit which operates cyclically is included in the system to provide intermittent operation of an alarm device.

The invention is illustrated in the accompanying drawing which is a circuit diagram for selective signalling equipment provided in accordance with the invention.

The selective system of the invention includes a section having a first pair of frequency responders and a circuit for charging a capacitor when a signal including the proper frequencies is applied to the responders. The voltage across the capacitor is applied to another section including a second pair of frequency responders and a transistor-relay control circuit having a capacitor which develops a control voltage when the proper frequencies are applied to the second pair of responders. The control voltage reaches the level necessary to activate the relay only if the two pairs of frequency responders operate in sequence. Thus. the selective system provides ample protection against random operation. The transistor-relay control circuit is provided with a bias network including a stabistor diode which stabilizes the operating point of the transistor with temperature changes, and which does not substantially reduce the dynamic output of the circuit. The control system also includes an oscillating transistor-relay circuit which provides intermittent operation of an alarm device.

Referring to the drawing the main parts of the equipment are the audio amplifier system 11, the frequency selective system 20 including two sections 18 and 19 in association with the frequency responders 17, and the control system 23 including the transistor-relay circuit 21, and the oscillating transistor-relay circuit 22. Each of these parts will be described in detail later, but the equipment as a whole will be considered first to provide an understanding of the relationships between the different circuits.

The equipment is provided with input terminals 12 which are adapted to be connected to a signal source which may provide signals containing intelligence and also calling signals. Ordinarily the signal source will be the radio receiver of the station with which the selective calling equipment is associated. The input signals are amplified first by the input amplifier 13, then by the driver amplifier 14, and finally by the push-pull output amplifier 15. The high level output is applied to the frequency responders 17 which are connected in a series parallel circuit between the output amplifier 15 and ground at point 25. The output of the amplifier 15 is maintained at a relatively constant level by an automatic gain control circuit 16. In the illustrated embodiment, twelve frequency responders are provided, each of which responds to a different frequency within the 300–1000 cycle per second range. The system is designed so that only four of the frequency responders are effective to provide decoding, and the responders with the desired frequencies are chosen by means of the multi-position switches A—A, B—B, C—C, and D—D. The contactors of the four chosen frequency responders are connected in respective pairs in the series circuits 18 and 19 included in the selective system 20. The calling signal includes four tones with one pair being transmitted first, followed by a pause, and then the other pair of tones. Direct current voltage is applied to circuits 18 and 19 from the terminal 26.

When a signal including the proper frequencies is applied to the windings of the responders associated with circuit 18, the reeds of these responders vibrate and intermittently close the associated fixed contacts. When these two responders are operated for a given time by signals including the proper frequencies, the capacitor 27 is charged to a predetermined level. This capacitor will act as a voltage source for the second circuit 19 for a given time after the first pair of contactors cease operating. The other pair of responders associated with circuit 19 are operated by the proper frequencies, and a voltage is developed in the secondary of the transformer 28.

This voltage is applied to transistor 29, and is normally at a level sufficient to drive the transistor into conduction. The transistor 29 provides amplified current which charges capacitors 122 and 123 to develop a control voltage which actuates the relay 31, and the contacts of this relay then close. Contacts 32 provide a holding circuit through which voltage is applied from terminal 36 to the relay 31 so that the relay remains energized after transistor 29 stops conducting. The closing of contacts 33 completes a circuit which applies voltage from terminal 36 to the transistor-relay oscillator 22 which in turn operates the flashing signal device 37. The operation of contacts 34 of relay 31 energizes the continuous signal device 38. The signal devices 37 and 38 may be lamps, buzzers or some other suitable alarm, and may be provided externally of the selective calling equipment itself. The control voltage may be utilized to perform other functions if desired.

Resetting of the system may be accomplished by external devices such as the ground reset 41 and the relay reset 42. The reset device 41 is operated to apply ground potential from an external point to the relay 31, and this effectively shorts the coil of the relay, releasing it and turning off the signal devices 37 and 38. The other reset device 42 is operated to apply operating voltage to the coil of relay 39, thus closing the grounded contacts 40 and shorting the coil of relay 31 to release it. One of the reset devices may be controlled by actuating a momentary reset switch, and the other may be controlled by the push-to-talk button which is normally provided on the microphone of the transmitter with which the selective calling equipment is associated.

In the following sections the various circuits of the equipment will be considered more completely.

*Audio Amplifying Section*

The amplifying section 11 includes four transistors 51, 52, 53 and 54 with each being connected in the common emitter configuration. Bias voltage for these transistors is supplied from the B+ terminal 43 and is divided by various resistor voltage dividers so that the emitter is biased most positive and the collector is most negative. The base is biased for class A operation in the case of transistors 51 and 52 and for class B operation in the case of transistors 53 and 54. The transformers 56, 57 and 58 provide interstage coupling and impedance matching for the amplifiers 13, 14 and 15. When a calling signal is applied to the terminals 12, a voltage of about 3 to 6 volts appears at the output 44 of the amplifying section.

The automatic gain control circuit 16 maintains the output voltage constant to within three decibels with input variations of 30 decibels. The output voltage is coupled to the rectifier diode 61 through a resistor 62. The rectified voltage provided by diode 61 is filtered by resistor 63 and capacitors 64 and 66, and the filtered voltage is applied to two semi-conductor diodes 67 and 68 which effectively shunt the input transformer 56. The diodes have a non-linear conduction characteristic, so their effective resistance varies with the forward bias applied thereto. The diodes 67 and 68 are biased in the reverse direction by voltage supplied from terminal 69, and the effective resistance of the diodes is controlled by the direct current voltage produced by the rectifier 61 and applied to the two diodes in the forward or conducting direction. The diodes 67 and 68 are poled oppositely with respect to the input signal, and therefore both polarities of the input signal will be limited. If the level of the input signal increases, the forward bias on diodes 67 and 68 will also increase, thus decreasing the effective resistance and lowering the level at which the input signal is limited. The diodes 67 and 68 may thus be considered as a variable potentiometer with the input transformer 56 connected to the variable arm. Capacitors 73 and 74 provide direct current isolation, and capacitors 71 and 72 reduce automatic gain control action on higher frequency tones because the proper drive level for the frequency responders 17 is approximately proportional to frequency.

*The Selective System*

As previously pointed out, twelve frequency responders or resonant reed relays are provided, and these are designated by numbers 77 to 88 inclusive. Each frequency responder has contactors consisting of a reed which vibrates when a particular frequency is applied to the coil associated therewith, and a fixed contact which the reed touches intermittently as it vibrates, thus providing an intermittent conductive path. The reeds of the frequency responders 77—88 are connected to the upper switch levels, and the fixed contacts of these frequency responders are connected to the lower switch levels as illustrated in FIG. 1. Switch A—A connects the contactors of one responder across points 91 and 92 of circuit 18; switch B—B connects the contactors of another responder across points 92 and 93 of circuit 18; switch C—C connects the contactors of a third responder across points 93 and 94 of circuit 19; and switch D—D connects the contactors of the fourth responder across points 94 and 95 of circuit 19. With the switches in the positions illustrated, responder 77 is selected by switch A—A, responder 78 is selected by switch B—B, responder 79 is selected by switch C—C and responder 80 is selected by switch D—D.

Operation of the frequency responders 77 and 78 by a calling signal including the proper frequencies will cause the capacitor 27 to be charged to a predetermined level determined by the values of resistors 101 and 113. The current in the series circuit 18 (and also in circuit 19) tends to be a series of pulses because of the intermittent circuit closure provided by the vibrating reeds. The contactors of responders 77, 78, 79 and 80 are bridged respectively by resistor 102 and capacitor 103, resistor 104 and capacitor 105, resistor 106 and capacitor 107, and resistor 108 and capacitor 109. Thus, closing of the contactor of responder 77 will discharge capacitor 103 and opening of this contactor will charge capacitor 103. The other bridging components operate in the same manner. The time constant of the resistance-capacitance bridges is chosen so that a continuous current flows in the series circuits despite the intermittent operation of the contactors. The resistor 101 limits current flow in the circuit 18 and together with resistor 113 controls the rate at which the capacitor 27 charges. The values of resistors 101 and 113 are selected so that the circuit 18 integrates the voltage applied thereto, and thus a predetermined time is required to charge capacitor 27. This prevents the capacitor 27 from becoming charged substantially by short noise bursts and the like. The resistor 113 paralleling capacitor 27 provides a discharge path for the condenser so that it discharges after the charging current ceases. The value of resistor 113 is such that a voltage built up on capacitor 27 by brief operation of the contactors decays rapidly, but a voltage built up by continuous operation of the contactors by the first pair of tones will be maintained for a substantial time after the tones cease.

When the condenser 27 is charged, it provides a source of potential for the second series circuit 19 which includes the contactors of responder 79, the contactors of responder 80, resistor 110, and the primary winding 111 of transformer 28 connected to ground. Operation of the contactors of responders 79 and 80 by signals including the appropriate frequencies received after the capacitor 27 has been charged will produce a current pulse in the second series circuit, and this will develop a voltage in the secondary winding 112 of the transformer 28 which is applied to the transistor 29. The transistor is initially biased somewhat beyond cutoff by voltage supplied from terminal 114. The voltage induced in winding 112 opposes the bias voltage and thus lowers the voltage on the base of transistor 29 so that the transistor becomes conductive. The transistor 29 is turned on and off in intermittent fashion because the voltage applied thereto is pulsating due to the vibratory operation of the frequency responders. The current pulses delivered by transistor 29 charge capacitors 122 and 123 in steps to a predetermined level to provide a control voltage. The control voltage is applied to relay 31 to energize it as previously explained.

Signals such as noise which tend to cause spurious operation may include frequencies which will operate all four responders at once. In this case, both the capacitor 27 and the coil 111 are effectively connected to the voltage source 26. When the circuit is initially completed, the capacitor begins to charge, and as the capacitor builds up a voltage it is applied to the transformer 28 which renders transistor 29 conductive. The transistor loads the sections 18 and 19 so that the capacitor 27 discharges faster than it does during normal operation when the discharge rate is determined only by resistor 113. For a given period of time, much less energy is transferred to capacitors 122 and 123 when all responders operate simultaneously than when they operate in sequence. The noise or other signal which operates the responders simultaneously ordinarily lasts only a short time, and therefore the control voltage provided by capacitors 122 and 123 does not reach the level required to operate the relay 31. Accordingly, system 20 provides ample protection against random operation.

The transistor-relay control circuit 21 is provided with the transistor 29 connected in the common emitter configuration, and bias potential is applied from terminal 114 to the transistor so that the emitter electrode 118 is positive with respect to the collector electrode 117, and the base electrode 116 is slightly more positive than the emitter. In this condition, the transistor is biased beyond cutoff. The transistor has a relatively low input impedance and this requires that impedance matching be provided. The windings 111 and 112 of transformer 28 have about a three to one turn ratio, and this transforms the input impedance of the transistor to match the impedance of capacitor 27. The filter consisting of capacitors 122 and 123 and resistor 124 is connected to the collector electrode 117 so that the output pulses supplied by the transistor in response to actuation by the selective system 20 are integrated and operation of the relay 31 is delayed. This delay affords further protection against undesired operation of the system.

The bias on the emitter electrode 118 is controlled by a voltage divider consisting of a stabistor diode 119 and a resistor 121 connected between the positive terminal 114 and ground. The bias current through the voltage divider is sufficiently large so that any current change caused by thermal agitation is relatively small, and therefore the base to emitter bias remains substantially constant. The stabistor 119 is a semiconductor diode which has a nonlinear conduction characteristic. This diode provides a relatively high resistance in the static condition of the transistor 29, and a relatively low resistance in the dynamic condition of the transistor as it responds to the control voltage applied thereto. Thus, although the current through the diode 119 increases considerably when the transistor is driven into conduction, the voltage drop across the diode remains relatively constant so that the voltage which is available to operate the relay 31 is not reduced substantially.

*Oscillator Control Circuit*

The oscillating transistor-relay circuit 22 includes a transistor 131 with its collector 132 grounded, and a relay 141 connected between the positive terminal 36 and the emitter 133 of the transistor. A capacitor 136 is connected from the positive side of the relay 141 to the base electrode 134. A pair of resistors 137 and 138 are series connected between the base 134 and ground, and the junction between these resistors is connected through the normally open contacts 142 of relay 141 to the voltage source 36. The other pair of contacts 143 of the relay 141 are connected to operate the flashing signal 37.

When relay 31 is operated in response to the calling signals, contacts 33 close and apply positive potential to the oscillator 22. Initially, the capacitor 136 charges rapidly and the source voltage is all developed across resistors 137 and 138. As the capacitor 136 charges, the voltage on the base electrode 134 decreases, and the transistor 131 becomes conductive. The transistor is connected essentially as an emitter follower, and thus as the current through the transistor increases, the voltage on the emitter 133 tends to follow that on the base, and the voltage across the relay 141 increases. When the voltage across the relay reaches the pull-in level, the relay operates and contacts 142 and 143 close. Contacts 143 turn on the flashing signal 37, and contacts 142 connect the resistor 137 across capacitor 136. The value of resistor 137 is low enough that the capacitor 136 begins to discharge. As the capacitor discharges, the voltage on the base electrode 134 increases, thereby raising the voltage on the emitter 133 and decreasing the voltage across the coil of the relay 141. When the voltage across the relay 141 reaches the drop-out level, the relay releases opening contacts 142 and 143. This starts a new cycle, with the capacitor 136 again charging to pull in the relay and discharging to release the relay as described above. The amplification provided by transistor 131 makes it possible to use a relatively small capacitor and a relatively low resistance relay. The charging and discharging time constants are selected so that the frequency of operation, and therefore, the frequency of the flashing indication provided by signal device 37, is about 1 cycle per second.

It is apparent from the foregoing description that the selective calling equipment of the invention has circuits which are simple and dependable in operation, and which effectively utilize transistors to afford more compact and lightweight construction. The frequency selective system is provided with several frequency responders, and switches to permit changing the code call of the associated station, even while the equipment is in use. The selective system is fast in operation and yet minimizes the chance of false operation by signals other than the calling signals. All circuits can be operated directly from a low voltage power source providing voltage of the order of thirty volts for example, and consequently an internal power supply is not necessary.

I claim:

1. A system for providing selective operation in response to a calling signal which includes a plurality of predetermined frequencies, said system including in combination, a plurality of frequency responsive devices each having contactor means for providing a conductive path in response to one of the predetermined frequencies, first impedance means including a capacitor, second impedance means including a transformer having primary and secondary windings, potential supplying means, a first circuit including said potential supplying means, said first impedance means, and the contactor means of at least one of said frequency responsive devices for charging said capacitor to provide a voltage across the same in response to a signal including a frequency to which said one device is responsive, a second circuit including the contactor means of at least another of said frequency responsive devices coupling said capacitor to said second impedance means whereby a voltage is developed across said secondary winding of said transformer when a voltage exists across said capacitor and in response to a signal including a frequency to which said other device is responsive, said transformer and said transistor loading said first and second circuits to prevent the buildup of a charge on said capacitor in response to simultaneous operation of said frequency responsive devices by spurious signals, and control means including a transistor device having an output circuit portion including a relay and a control circuit portion including said secondary winding of said transformer, said transformer having a turns ratio to provide impedance matching between said capacitor and said transistor device, and said transformer rendering said transistor device conductive to energize said relay when the voltage across said secondary winding of said transformer exceeds a predetermined level.

2. A system for providing selective operation in response to a calling signal which includes a plurality of predetermined frequencies, said system including in combination, a plurality of frequency responsive devices each having contactor means for providing a conductive path in response to one of the predetermined frequencies, first impedance means including a first capacitor, second impedance means including a transformer having primary and secondary windings, potential supplying means, a first circuit including said potential supplying means, said first impedance means, and the contactor means of at least one of said frequency responsive devices for charging said capacitor to provide a voltage across the same in response to a signal including a frequency to which said one device is responsive, a second circuit including the contactor means of at least another of said frequency responsive devices coupling said capacitor to said second impedance means whereby a voltage is developed across said secondary winding of said transformer when a voltage exists across said capacitor and in response to a signal including a frequency to which said other device is responsive, and control means including a transistor device having a control circuit portion including said secondary winding of said transformer, an output circuit portion including a second capacitor and a relay, and a potential supplying circuit portion including a semiconductor diode having a non-linear conduction characteristic for normally biasing said transistor device in a non-conductive condition, said transformer rendering said transistor device conductive to charge said second capacitor and energize said relay said non-linear characteristic of said diode maintaining the bias developed across said diode relatively constant despite an increase in current therethrough upon transistor conduction.

3. A selective calling system operable by a calling signal which includes a plurality of predetermined frequencies, said system including in combination, a plurality of frequency responsive devices each having contactor means for providing a conductive path in response to one of the predetermined frequencies, a first selective circuit including potential supplying means, a first capacitor, and the contactor means of a pair of said frequency responsive devices for providing a voltage across said first capacitor in response to a signal including frequencies to which said first pair of devices are responsive, a second selective circuit including a transformer and the contactor means of a second pair of said frequency responsive devices connected in series to said first capacitor whereby a voltage is developed across said transformer when a voltage exists across said first capacitor and in response to a signal including frequencies to which said second pair of devices are responsive, switch means connected between said first and second selective circuits and said frequency responsive devices for coupling the contactor means of any of said devices to said first and second circuits to provide selection of said first and second pairs, a first transistor device coupled to said transformer, said transformer having a turns ratio to provide impedance matching between said first selective circuit and said transistor device and applying the voltage developed thereacross to said first transistor device to render the same conducting when such voltage exceeds a predetermined level, a bias circuit coupled to said first transistor device including a semiconductor diode normally biasing said transistor device in a non-conductive condition, said semiconductor diode having a non-linear resistance characteristic which maintains the bias potential developed across said diode relatively constant despite an increase of current flowing therethrough when said transistor device is rendered conducting as aforesaid, an output circuit portion coupled to said first transistor device including a second capacitor and a first relay, with the conduction of said first device charging said second capacitor to develop a control voltage for operating said first relay, said first and second capacitors providing delay of the voltages developed thereby for protecting against operation of said first relay in response to spurious signals, a circuit for holding said first relay in such operated condition for providing a desired continuous control function, a second transistor device, a second relay coupled to said second transistor device, a potential supplying circuit coupled to said second transistor device including a resistor and a condenser for normally biasing said second transistor device in a non-conductive condition, said first relay having contacts in said potential supplying circuit providing a conducting path upon operation thereof to charge said condenser, thereby rendering said second transistor device conducting and energizing said second relay after a predetermined time, said second relay having contacts in said potential supplying circuit connecting said resistor across said condenser upon operation of said second relay to provide a discharge path, said condenser deenergizing said second relay when discharged to a predetermined level, whereby the charging and discharging of said condenser alternately energizes and de-energizes said second relay to provide a desired intermittent control function.

4. A system for providing selective operation in response to a calling signal which includes a plurality of predetermined frequencies, said system including in combination, a plurality of frequency responsive devices each having means for providing a conductive path in response to one of the predetermined frequencies, a first circuit including potential supplying means, first integrating means including a first impedance element, and at least one of said frequency responsive devices for providing a voltage across said first impedance element in response to a signal including a frequency to which said one device is responsive, a second circuit including a second impedance element and at least another of said frequency responsive devices connected in series to said first circuit and to a second impedance element whereby a voltage is developed across said second impedance element only when a voltage exists across said first impedance element and in response to a signal including a frequency to which said other device is responsive, a transistor device coupled to said second impedance element, an output circuit portion coupled to said transistor device and including second integrating means and a relay, a potential supplying circuit portion coupled to said transistor device and including a semiconductor diode normally biasing said transistor device in a non-conductive condition, and an input circuit portion coupled to said transistor device and responsive to the voltage across said second impedance element to render said transistor device conducting, thereby providing a control voltage across said second integrating means for energizing said relay at a predetermined level of said control voltage, said semiconductor diode having a static resistance value to stabilize the bias condition of said transistor device with temperature changes, and said semiconductor diode having a dynamic resistance value substantially lower than said static resistance value which maintains the bias potential developed across said diode relatively constant despite an increase of current flowing therethrough when said transistor device is rendered conducting as aforesaid, and said first and second integrating means having time constants to delay the voltages developed thereby for protecting against operation of said relay in response to spurious signals.

References Cited in the file of this patent

UNITED STATES PATENTS

| | | |
|---|---|---|
| 2,510,139 | Purington | June 6, 1950 |
| 2,524,300 | Taylor | Oct. 3, 1950 |
| 2,542,264 | Smith | Feb. 20, 1951 |
| 2,581,806 | McShirley | Jan. 8, 1952 |
| 2,626,384 | Winkler | Jan. 20, 1953 |
| 2,866,925 | Wunderman | Dec. 30, 1958 |
| 2,907,932 | Patchell | Oct. 6, 1959 |
| 2,912,574 | Gensel | Nov. 10, 1959 |

OTHER REFERENCES

A.I.E.E. Technical Paper 49–100, Dec. 1948 (by Pruden et al.) 14 pages.